United States Patent
Cornett

(10) Patent No.: US 9,103,394 B2
(45) Date of Patent: Aug. 11, 2015

(54) HEAVY DUTY BRAKE DRUM WEAR INDICATOR

(75) Inventor: Byron E. Cornett, Cullman, AL (US)

(73) Assignee: WEBB WHEEL PRODUCTS, INC., Cullman, AL (US)

( * ) Notice: Subject to any disclaimer, the term of this patent is extended or adjusted under 35 U.S.C. 154(b) by 654 days.

(21) Appl. No.: 12/778,442

(22) Filed: May 12, 2010

(65) Prior Publication Data

US 2011/0278102 A1 Nov. 17, 2011

(51) Int. Cl.
*F16D 66/02* (2006.01)
*F16D 65/10* (2006.01)
*F16D 65/02* (2006.01)

(52) U.S. Cl.
CPC ............... *F16D 65/10* (2013.01); *F16D 66/02* (2013.01); *F16D 2065/1332* (2013.01)

(58) Field of Classification Search
USPC ...................................................... 188/218 R
See application file for complete search history.

(56) References Cited

U.S. PATENT DOCUMENTS

| | | | | |
|---|---|---|---|---|
| 1,949,670 A * | 3/1934 | Winters | ...................... | 188/250 B |
| 2,288,438 A * | 6/1942 | Dach | .......................... | 188/218 R |
| 2,978,073 A * | 4/1961 | Soddy | ........................ | 188/218 R |
| 3,007,553 A * | 11/1961 | Sinclair et al. | ............ | 188/218 R |
| 3,038,563 A * | 6/1962 | Boegehold | ................ | 188/218 R |
| 3,414,272 A * | 12/1968 | Rogers, Jr. | ...................... | 277/321 |
| 3,782,513 A * | 1/1974 | Birge | .......................... | 188/206 R |
| 5,038,898 A * | 8/1991 | Inoue | ................................ | 188/328 |
| 5,385,216 A * | 1/1995 | Kulczycki | .................... | 188/70 R |
| 5,878,479 A * | 3/1999 | Dickerson et al. | ........... | 29/527.6 |
| 5,893,434 A * | 4/1999 | Walker et al. | ........... | 188/1.11 W |
| 6,308,803 B1 * | 10/2001 | Oberti | ..................... | 188/1.11 W |
| 6,460,939 B1 * | 10/2002 | Claes | ........................ | 301/95.101 |
| 6,477,893 B1 * | 11/2002 | Djordjevic | ....................... | 73/129 |
| 6,631,791 B2 * | 10/2003 | Moore et al. | ............. | 188/1.11 W |
| 6,767,070 B1 * | 7/2004 | Chiang et al. | .............. | 301/95.11 |
| 7,267,210 B2 * | 9/2007 | Cornolti et al. | ......... | 188/218 XL |
| 7,325,659 B2 * | 2/2008 | Pfaff | .......................... | 188/218 R |
| 7,617,914 B1 * | 11/2009 | Huang et al. | ............... | 188/73.37 |
| 8,181,753 B2 * | 5/2012 | Levering et al. | .......... | 188/218 R |
| 2002/0117360 A1 * | 8/2002 | Toby | ....................... | 188/1.11 W |
| 2006/0076196 A1 * | 4/2006 | Palladino | ............... | 188/1.11 W |
| 2009/0084638 A1 * | 4/2009 | Masterson | ............... | 188/1.11 W |
| 2011/0005876 A1 * | 1/2011 | Jenkinson et al. | ........ | 188/218 R |

FOREIGN PATENT DOCUMENTS

FR 2878923 A1 * 6/2006
GB 2006900 A * 5/1979 ............. F16D 66/02

* cited by examiner

*Primary Examiner* — Robert A Siconolfi
*Assistant Examiner* — James Hsiao
(74) *Attorney, Agent, or Firm* — DLA Piper LLP (US); R. Blake Johnston

(57) ABSTRACT

A brake drum is disclosed which is configured for providing an external visual indication of braking surface diameter safe operating limits while installed on a vehicle and includes one or more indentations in its outer surface overlaying the area defined by the interior braking surface where the depth of an indentation is at least co-level with a prescribed safe operating diameter of the braking surface.

13 Claims, 6 Drawing Sheets

HEAVY DUTY BRAKE DRUM WEAR INDICATOR

BACKGROUND

1. Field

The present invention relates generally to brake drums, and more particularly, to brake drums for heavy-duty vehicles having an external visual indication of whether braking surface diameter is within safe operating limits.

2. Description of the Problem and Related Art

A brake drum's maximum allowable braking surface diameter is the largest diameter that a brake drum's braking surface can be machined, or worn to, and still maintain satisfactory characteristics for safe and expected braking performance. It is a violation of Department of Transportation regulations to use a brake drum whose braking surface diameter exceeds the maximum allowable diameter. At this time, there is not an accurate method of determining whether a brake drum's braking surface diameter has worn to, or exceeded, the maximum allowable diameter while the brake drum is installed on a vehicle. Accordingly, the entire wheel must be removed from the vehicle and the brake drum surface diameter must be measured. It is both time consuming and expensive—not to mention safety issues involved with removing and reinstalling wheel end equipment—to remove a brake drum from an axle to determine whether or not a brake drum has worn to the point that the braking surface diameter exceeds the maximum allowable diameter. This can lead to brake drums being discarded and replaced sooner than needed, or it can lead to brake drums remaining in service after the braking surface diameter exceeds the maximum allowable diameter.

With reference to FIGS. 7 and 7A of the drawings, a prior art technique to permit visual inspection of brake surface diameter has used a notch 30 machined circumferentially around the braking surface at the lip of the drum for wear indication. This method, however, may provide misread inspections because of uneven wear of the brake linings and drum. A step is worn into the lining near the lip of the drum. This uneven wear leads to inaccurate evaluations of both lining wear and brake drum wear, leading to either early removal of a good brake drum, or worse, non-removal of a bad brake drum.

SUMMARY

The present disclosure is directed to a brake drum configured for accurate, visual indication of braking surface adequate thickness without removal from the vehicle on which it is installed.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

An exemplary brake drum includes one or more indentations in its outer surface overlaying the area defined by the interior braking surface where the depth of an indentation is at least co-level with a prescribed safe operating diameter of the braking surface.

This and other embodiments will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
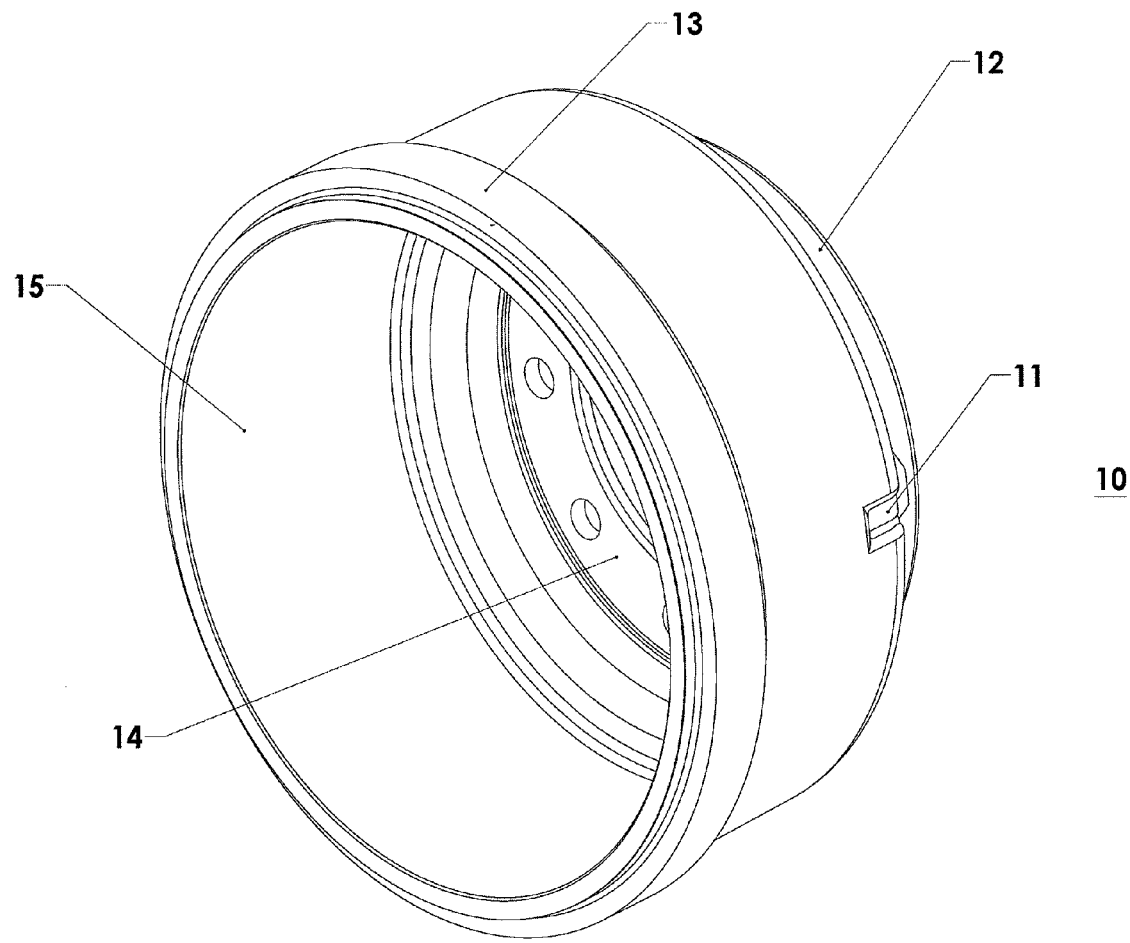
FIG. 1 is an inboard perspective view of an exemplary brake drum with wear indicator in braking surface outer wall in an unworn condition.
Figure 2:
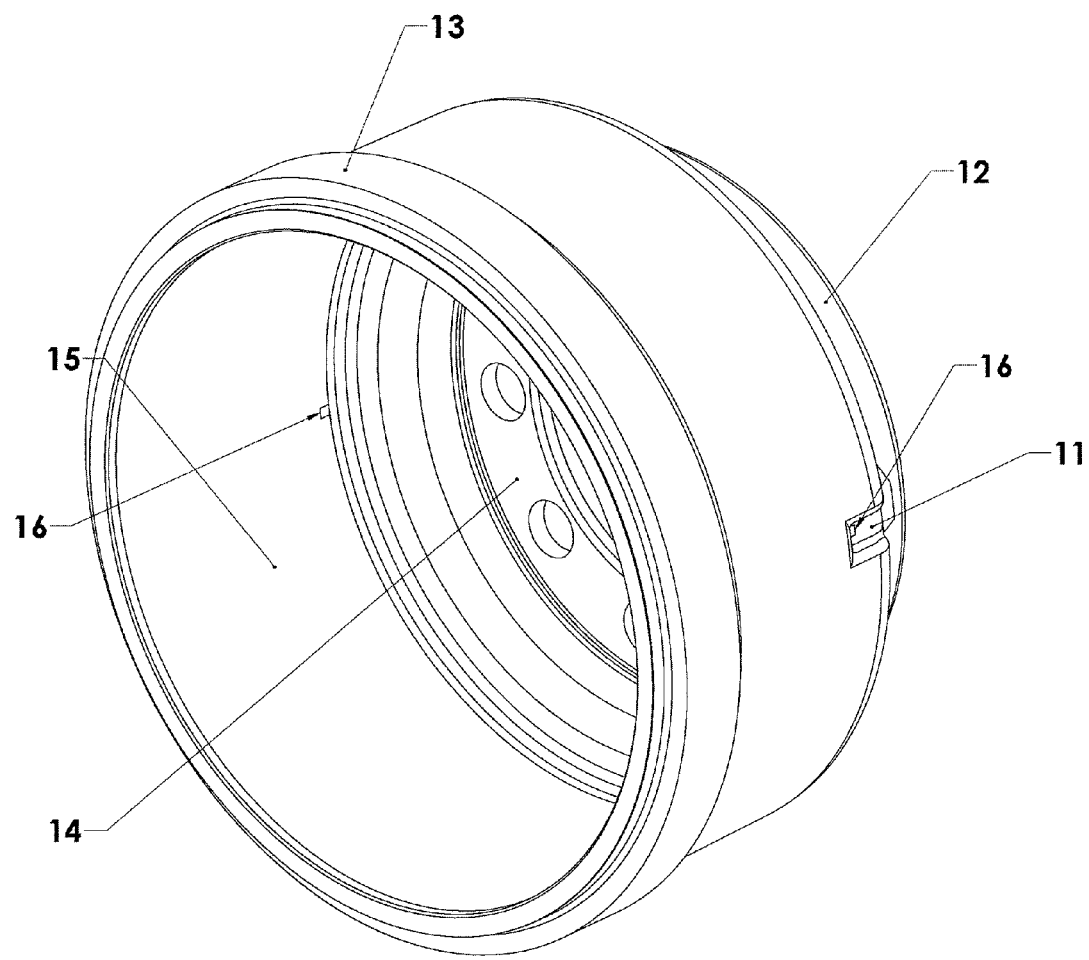
FIG. 2 is inboard perspective view of an exemplary brake drum with wear indicator notches in braking surface outer wall at maximum braking surface diameter.
Figure 3:
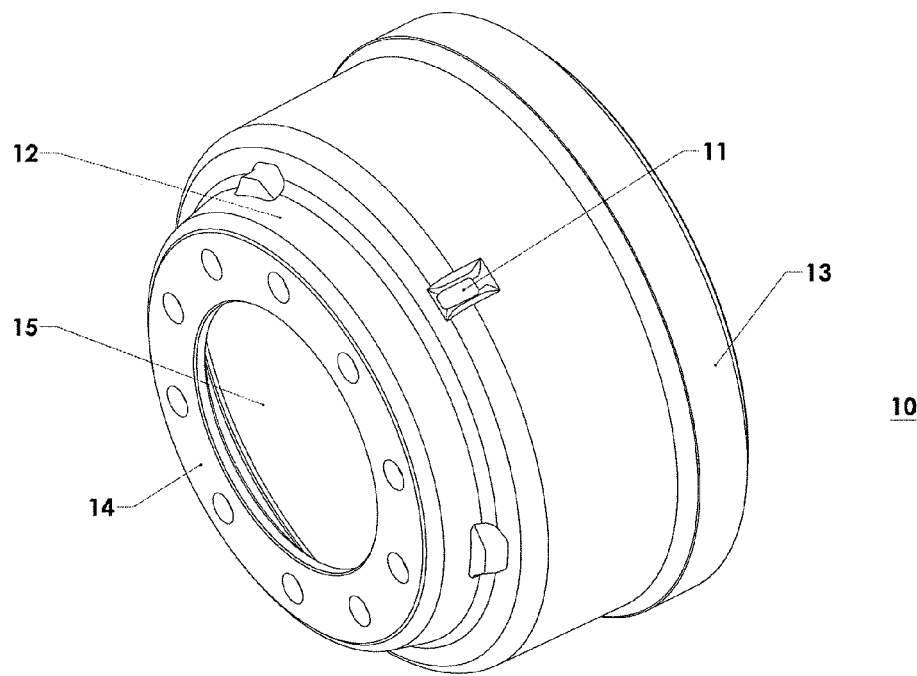
FIG. 3 is an outboard perspective view of an exemplary brake drum with wear indicator notches defined in the outer wall where the braking surface is in an unworn condition.
Figure 4:
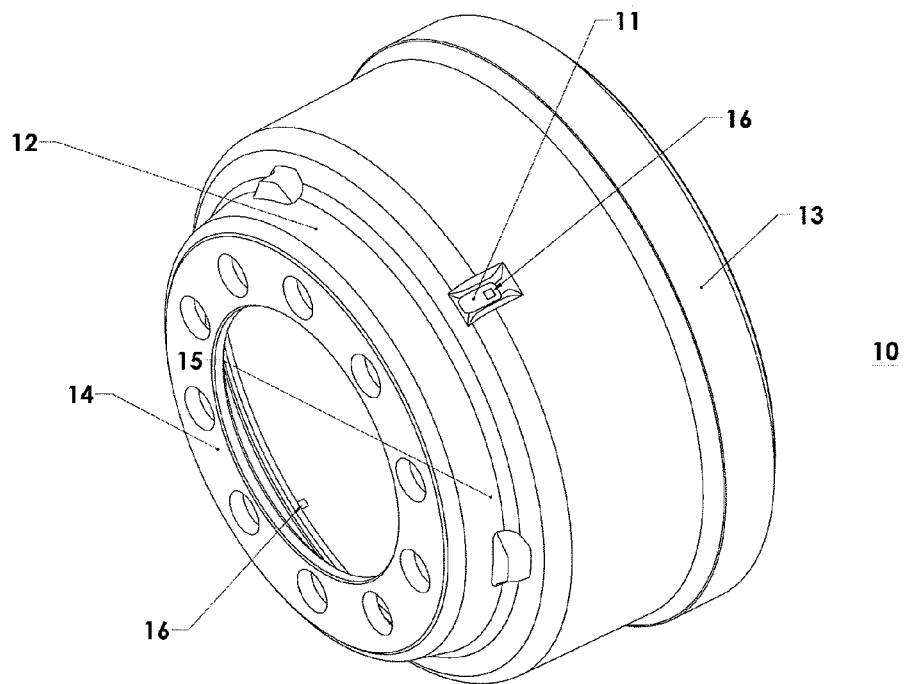
FIG. 4 is an outboard perspective view of a brake drum with wear indicator notches defined in the drum's outer wall where the braking surface is at maximum braking surface diameter.
Figure 5:
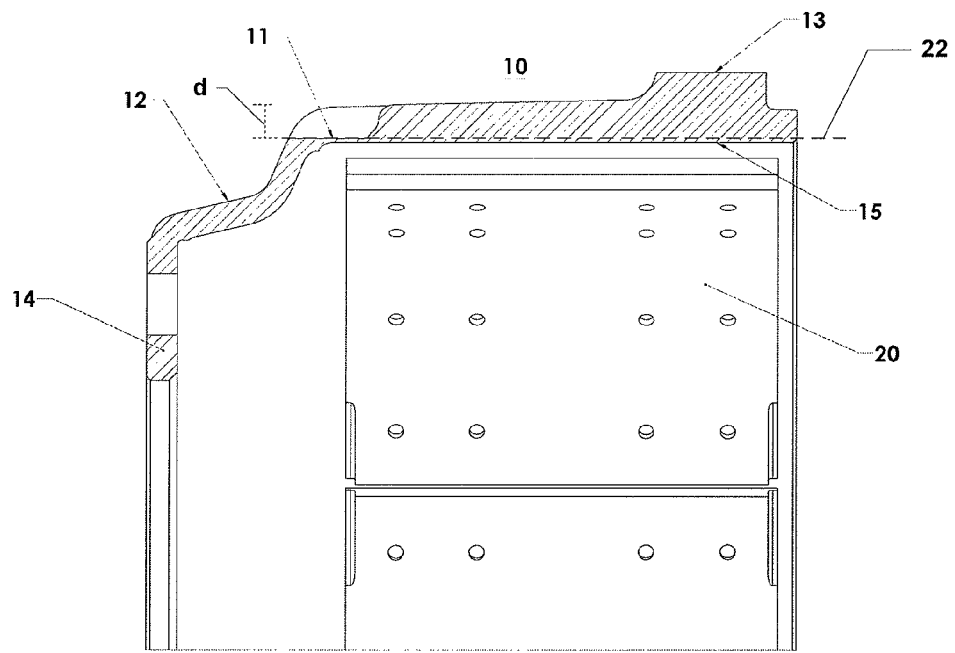
FIG. 5 is a sectional view of a brake drum with wear indicator notch defined in the outer wall where the braking surface is in an unworn condition.
Figure 6:
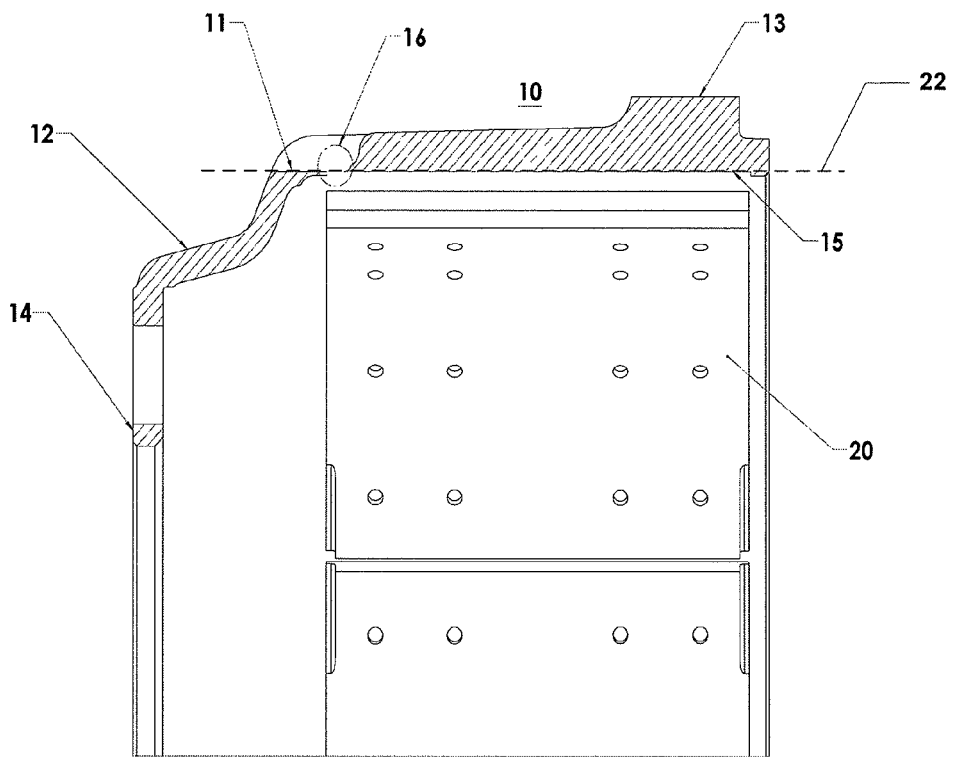
FIG. 6 is a sectional view of a brake drum with wear indicator notch in braking surface outer wall at maximum braking surface diameter.
Figure 7A:
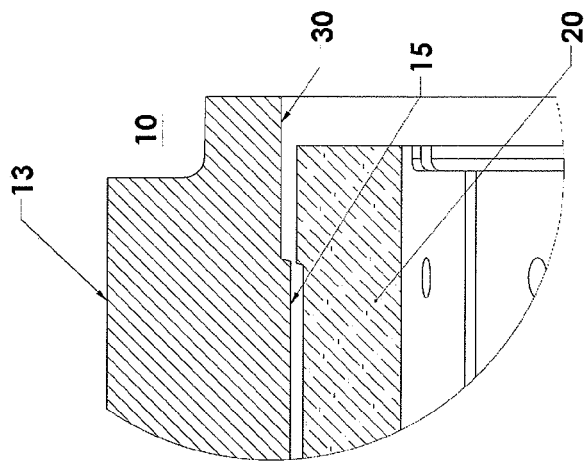
FIGS. 7, & 7A is a section view of a prior art brake drum with a circumferential notch showing potential uneven wear pattern of lining that can cause an inaccurate indication of braking surface wear.
Figure 7:
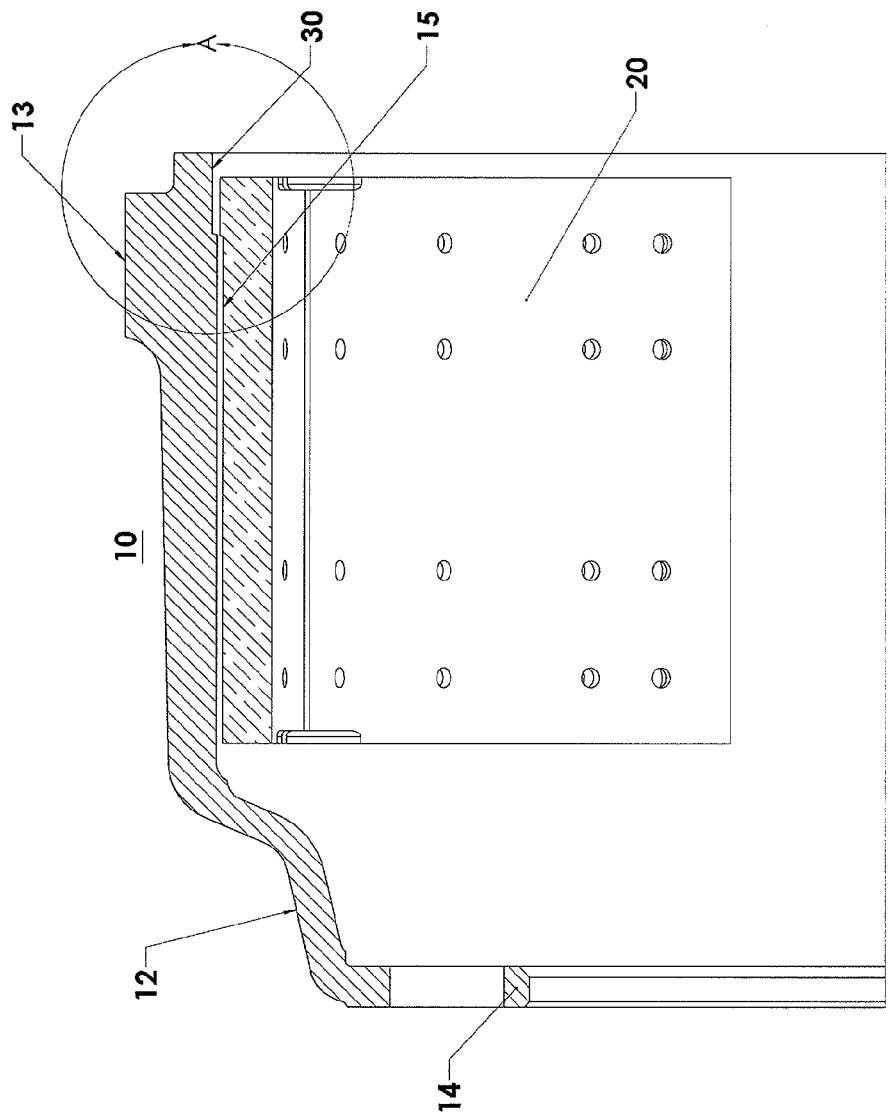
Figure 8:
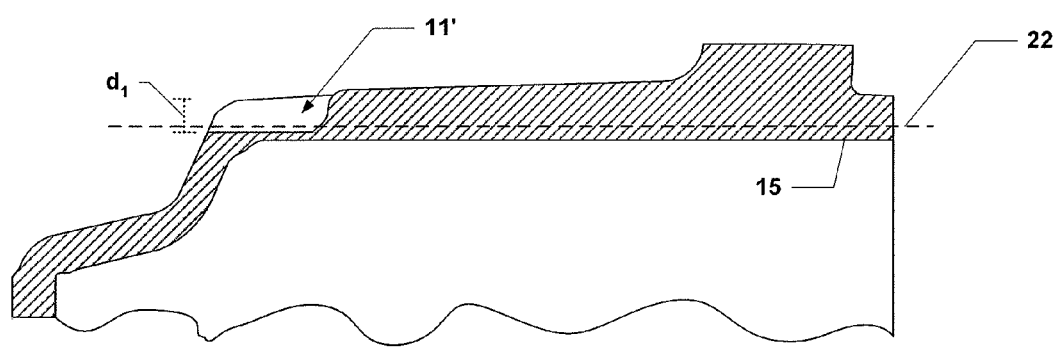
FIG. 8 is a section view of a brake drum with a wear indicator notch defined in the outer surface of the drum at a depth greater that the level of the maximum braking surface diameter and the braking surface is in an unworn condition.
Figure 9:
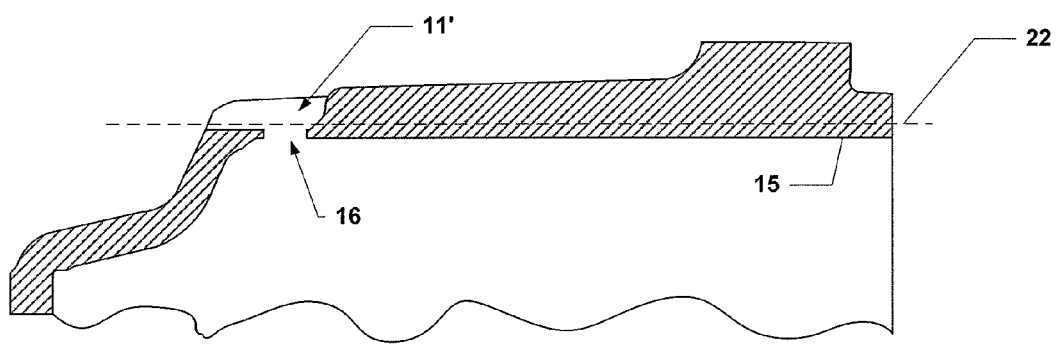
FIG. 9 is a section view of the brake drum of FIG. 8 where the braking surface is worn.

The various embodiments of the present invention and their advantages are best understood by referring to FIGS. 1 through 9 of the drawings. The elements of the drawings are not necessarily to scale, emphasis instead being placed upon clearly illustrating the principles of the invention. Throughout the drawings, like numerals are used for like and corresponding parts of the various drawings.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment. Finally, as used in this description, terms such as "inboard" and "outboard" are to be understood as they relate to a vehicle on which the brake drum is mounted.

An exemplary brake drum 10 comprises a brake surface 15 made from cast iron or other friction and wear resistant material, a mounting plate 14 at the brake drum's outboard end with mounting holes for mounting the drum to the hub of a vehicle axle, a wraparound, or shoulder portion 12, and one or more squealer bands 13 circumscribing the brake drum. A brake drum 10 is typically used with a brake shoe 20. In operation, the shoe 20 is selectively applied to the braking surface 15 of the brake drum 10 through actuation of the brake. Brake drum 10 converts kinetic energy and potential energy of the vehicle into heat energy by providing a friction surface for the brake shoe 20 thereby transmitting brake torque to the wheels and tires of the vehicle.

A notch 11, or indentation, is defined in the outer surface of the drum 10, preferably near the shoulder 13 area. The indentation 11 is formed with a depth d in relation to the outer surface of the drum 10 that terminates at or below within the maximum allowable diameter 22 of the braking surface 15. The indentation 11 extends inboard from the shoulder 13 so that at least a portion of the area of the indentation 11 overlaps the area of the braking surface that makes contact with the brake shoe 20. As the braking surface 15 is worn away through use, and the maximum diameter is reached, the area covering the indentation 11 is worn away, revealing an opening 16 that may be visually perceived in inspection. Since the indentation 11 is located on the shoulder 13 of the brake drum 10, it may be inspected while the drum 10 is still mounted on the vehicle. Thus, if upon visual inspection, the interior of the drum 10 cannot be seen, the brake drum is within the maximum diameter. On the other hand, if the interior of the brake drum can be seen through the opening 16, the braking surface is worn beyond the maximum allowable diameter and the drum 10 needs to be replaced. It is contemplated that a plurality of indentations 11 may be defined in the drum 10 as described above at different locations about the circumference of the drum surface, that are generally accessible while the drum is installed on the vehicle, to increase the possible inspection locations.

As an alternative, a deeper indentation 11' may be manufactured as described above except to a depth $d_1$ coinciding with a braking surface diameter less than the maximum allowable braking surface 15 diameter. As such, when the braking surface has sufficiently worn away such that the interior is visually perceivable, it indicates that the braking surface 15 has worn close to, but has not yet reached, the maximum allowable diameter of the braking surface 15 of the brake drum 10. This provides an additional margin of safety. In addition, the deeper indentation 11' may be used in conjunction with the shallower indentation 11.

Through the use of the aforementioned features, the inventive brake drum provides a number of advantages. Because braking surface diameter may be easily visually inspected, a determination can be made by shop personnel, the driver, or law enforcement personnel. The brake drum will not have to be removed from the axle and measured to determine whether the braking surface has reached the maximum allowable diameter. This reduces vehicle down time, labor, and maintenance costs attributable to inspection. Lastly, use of the windows 16 reduces likelihood of a brake drum remaining in service after the braking surface diameter has reached or exceeded the maximum allowable diameter.

As described above and shown in the associated drawings, the present invention comprises a heavy duty brake drum having a brake lining wear indicator. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A brake drum comprising:
   a cylindrical drum body having a cylindrical outer surface, an open inboard end and an outboard end including a mounting plate, said mounting plate separated from the cylindrical outer surface by a shoulder portion;
   a cylindrical braking surface within said drum body having an area and defining a hollow interior of said brake drum; and
   an indentation defined in the shoulder portion of the drum body and extending inboard from the shoulder portion into said outer surface towards the open inboard end of said drum body, said indentation having an opposing pair of sidewalls, a back wall positioned in the cylindrical outer surface, a front opening positioned in the shoulder portion and opposing the back wall, an open end formed through said outer surface of the drum body and a closed end that is in radial alignment with the open end and a portion of the braking surface area, said indentation also having a depth measured from the cylindrical outer surface of the drum body, and the corresponding open end of the indentation, to the closed end of said indentation such that when said braking surface is worn away beyond a pre-defined braking surface diameter, the hollow interior of said brake drum is visible through the open end of the indentation; and
   wherein said depth is at least co-level with the pre-defined braking surface diameter.

2. The brake drum of claim 1, wherein said depth is greater than the level at which the pre-defined braking surface diameter occurs.

3. The brake drum of claim 1, further comprising at least two indentations.

4. The brake drum of Claim 3, wherein said at least two indentations comprise one of a first depth and one of a second depth, said first depth being at least co-level with a pre-defined braking surface diameter, and said second depth being greater than said first depth.

5. A vehicle comprising:
   a brake drum having a cylindrical outer surface, an open inboard end and an outboard end including a mounting plate, said mounting plate separated from the cylindrical outer surface by a shoulder portion and an interior cylindrical braking surface defining a hollow interior of said brake drum, said brake drum including one or more indentations in the shoulder portion of the drum body extending inboard from the shoulder portion into the outer surface towards the open inboard end of the brake drum, each said indentation featuring an opposing pair of sidewalls, a back wall positioned in the cylindrical outer surface, a front opening positioned in the shoulder portion and opposing the back wall, an open end formed through said outer surface of the drum body and a closed end that is in radial alignment with the open end and a portion of said braking surface, each said indentation also having a depth measured from the cylindrical outer surface of the drum body, and the corresponding open end of the indentation, to the closed end of said indentation that is at least co-level with a prescribed safe operating diameter of said braking surface such that when said braking surface is worn away beyond the prescribed safe operating diameter, the hollow interior of said brake drum is visible through the open end of the indentation.

6. The vehicle of claim 5, wherein said depth is greater than the level at which the prescribed safe operating diameter occurs.

7. The vehicle of claim 5, wherein said one or more indentations include at least two indentations comprising one of a first depth and one of a second depth, said first depth being at least co-level with said prescribed safe operating diameter of said braking surface, and said second depth being greater than said first depth.

8. The brake drum of claim 1 wherein each of the pair of opposing sidewalls of the indentation are tapered towards one another in a direction from the open end towards the closed end.

9. The brake drum of claim 8 wherein the back wall of the indentation is tapered towards the front opening in a direction from the open end towards the closed end.

10. The brake drum of claim 1 wherein the back wall of the indentation is tapered towards the front opening in a direction from the open end towards the closed end.

11. The vehicle of claim 5 wherein each of the pair of opposing sidewalls of the indentation are tapered towards one another in a direction from the open end towards the closed end.

12. The vehicle of claim 11 wherein the back wall of the indentation is tapered towards the front opening in a direction from the open end towards the closed end.

13. The vehicle of claim 5 wherein the back wall of the indentation is tapered towards the front opening in a direction from the open end towards the closed end.

* * * * *